United States Patent [19]
Kurosawa

[11] Patent Number: 6,035,147
[45] Date of Patent: *Mar. 7, 2000

[54] CCD MOUNTING STRUCTURE FOR EXCHANGEABLE CAMERA BACK

[75] Inventor: Yuichi Kurosawa, Tokyo, Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/921,467

[22] Filed: Sep. 2, 1997

[30] Foreign Application Priority Data

Sep. 3, 1996 [JP] Japan ................................. 8-232809

[51] Int. Cl.[7] ........................................... G03B 17/48
[52] U.S. Cl. ........................ 396/429; 396/544; 348/64; 348/233; 348/373
[58] Field of Search ................................ 396/354, 359, 396/429, 432, 440, 446, 511, 517, 519, 520, 544; 348/64, 220, 373, 231, 232, 233

[56] References Cited

U.S. PATENT DOCUMENTS

| | | | |
|---|---|---|---|
| 3,563,144 | 2/1971 | Fukino | 396/442 |
| 4,348,086 | 9/1982 | Forscher | 396/544 |
| 4,531,818 | 7/1985 | Bally | 396/544 |
| 4,648,696 | 3/1987 | Park et al. | 396/446 |
| 5,541,689 | 7/1996 | Shimoda | 396/517 |
| 5,561,458 | 10/1996 | Cronin et al. | 348/64 |

*Primary Examiner*—Safet Metjahic
*Assistant Examiner*—J. K. Han
*Attorney, Agent, or Firm*—Greenblum & Bernstein, P.L.C.

[57] ABSTRACT

A camera includes a camera body and a detachable camera back. The camera body includes a guide section arranged in a plane perpendicular to an optical axis defined by a lens associated with the camera body. The camera back includes an imaging device and a biasing member which biases the imaging device such that, when the camera back is attached to the camera body, the imaging device is press contacted against the guide section. In particular, the guide section includes a pair of rails provided next to a photographing aperture of the camera body that defines an image forming plane for the camera. The imaging device may further include a glass plate provided in front of an image receiving surface that functions to shift an image plane along the optical axis of the camera.

15 Claims, 7 Drawing Sheets

FIG. 7A
FIG. 7B
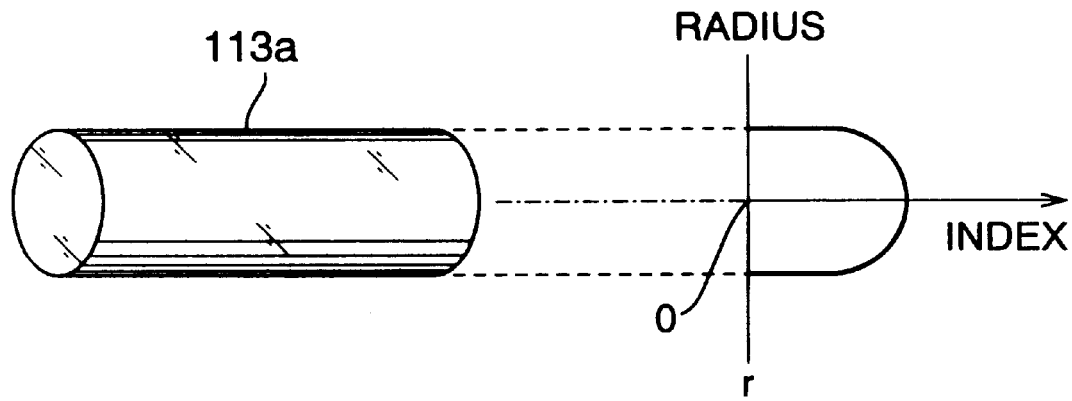
FIG. 7C
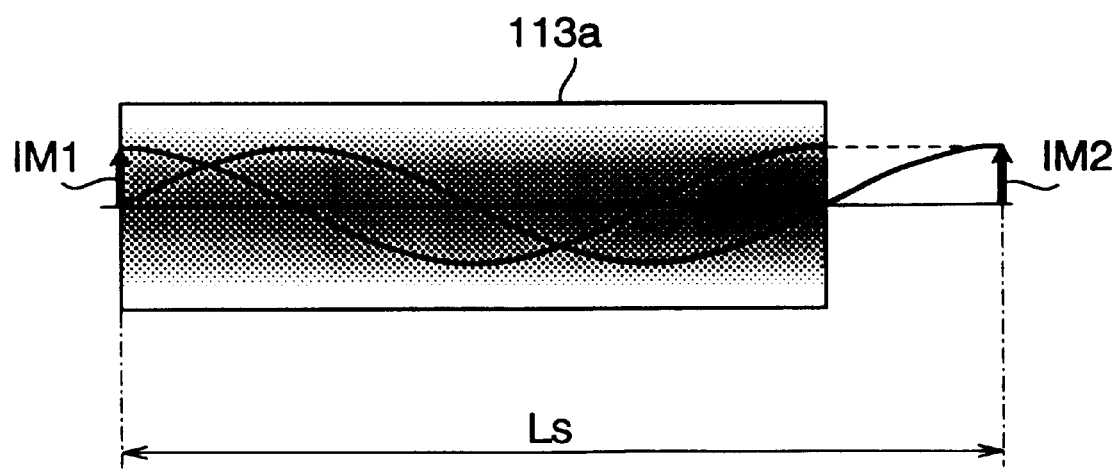

CCD MOUNTING STRUCTURE FOR EXCHANGEABLE CAMERA BACK

BACKGROUND OF THE INVENTION

The present invention relates to a camera using an exchangeable camera back, and particularly to a structure of an exchangeable camera back which is provided with an imaging device such as a CCD (Charge Coupled Device).

Recently, a camera having an exchangeable camera back has been developed that allows a user to select between taking a picture using conventional photographic film (conventional photography) and attaching a camera back for taking a picture using an imaging device (digital photography). For example, in an SLR (single lens reflex) camera, a back cover which closes over the photographic film is detachable, and an imaging device camera back may be attached instead of the back cover so that digital photography can be performed.

In a conventional imaging device camera back, the imaging device is fixedly secured to the body of the camera back, i.e., the positional relationship between the imaging device and the body of the camera back is fixed. When such an imaging device camera back is attached to a camera body, an image receiving surface of the imaging device may not coincide with an image forming plane of the camera body, due to manufacturing errors or the like. Further, it is difficult and time-consuming for a user to adjust the image receiving surface every time the camera back is attached to the camera body.

SUMMARY OF THE INVENTION

It is therefore an object of the invention to provide an improved imaging device camera back in which the image receiving surface of an imaging device is accurately positioned easily without a complicated or costly adjustment mechanism.

According to an aspect of the present invention, there is provided, a camera including a camera body and a detachable camera back. The camera body includes a guide section arranged in a plane perpendicular to an optical axis defined by the camera body. The camera back includes an imaging device and a biasing member which biases the imaging device such that, when the camera back is attached to the camera body, the imaging device is press contacted against the guide section. With this arrangement, because the imaging device is biased to press contact the guide section, which is perpendicular to the optical axis, the imaging device will be accurately positioned perpendicular to the optical axis.

In a particular case, the guide section includes a pair of rails provided next to a photographing aperture of the camera body and the rails define an image forming plane for the camera.

In another particular case, the biasing member includes a spring member which applies a biasing force at least in a direction of the optical axis of the camera. In this case, the spring member may include a plate spring that includes a plate portion fixed to the camera back and a plurality of resilient leg portions extending from the plate portion. In particular, the leg portions are connected to a rear side of the imaging device such that the connections are slidable in predetermined directions along the rear side of the imaging device.

In another particular case, the imaging device may further include a glass plate provided in front of an image receiving surface thereof. In one embodiment of this case, when the imaging device is press contacted to the guide section, the glass plate protrudes into the photographing aperture and functions to shift an image plane along the optical axis of the camera. In particular, the glass plate is designed to have a predetermined thickness and a predetermined index of refraction such that an in-focus image is formed on an image receiving surface of the imaging device. In another embodiment of this case, when the imaging device is press contacted to the guide section, the glass plate press contacts the guide section so that a front surface of the glass plate coincides with the image plane and the glass plate functions to shift the image plane along the optical axis of the camera. Preferably, the glass plate is formed as a rod lens array.

According to another aspect of the present invention, there is provided, a camera back for use with a camera having a guide section which defines an image plane of the camera. The camera back includes an imaging device and a biasing member that biases the imaging device to press contact the guide section such that an image receiving surface of the imaging device is in a predetermined eposition.

In a particular case, the imaging device further includes a glass plate provided at a front thereof, such that, when the imaging device is press contacted to the guide section, the glass plate protrudes into the photographing aperture. In particular, the glass plate is designed to have a predetermined thickness and a predetermined index of refraction such that an in-focus image is formed on an image receiving surface of the imaging device.

In another particular case, the imaging device further includes a glass plate provided at a front thereof, such that, when the imaging device is press contacted to the guide section, the glass plate press contacts the guide section. In particular, the glass plate is formed as a rod lens array.

DESCRIPTION OF THE ACCOMPANYING DRAWINGS

FIG. 7A shows an element of the rod lens array shown in FIG. 6B;

FIG. 7B shows a distribution of the index of refraction for the element shown in FIG. 7A; and FIG. 7C is a diagram illustrating a principle of light transmission in the rod lens array.

DESCRIPTION OF THE EMBODIMENT

Figure 1:
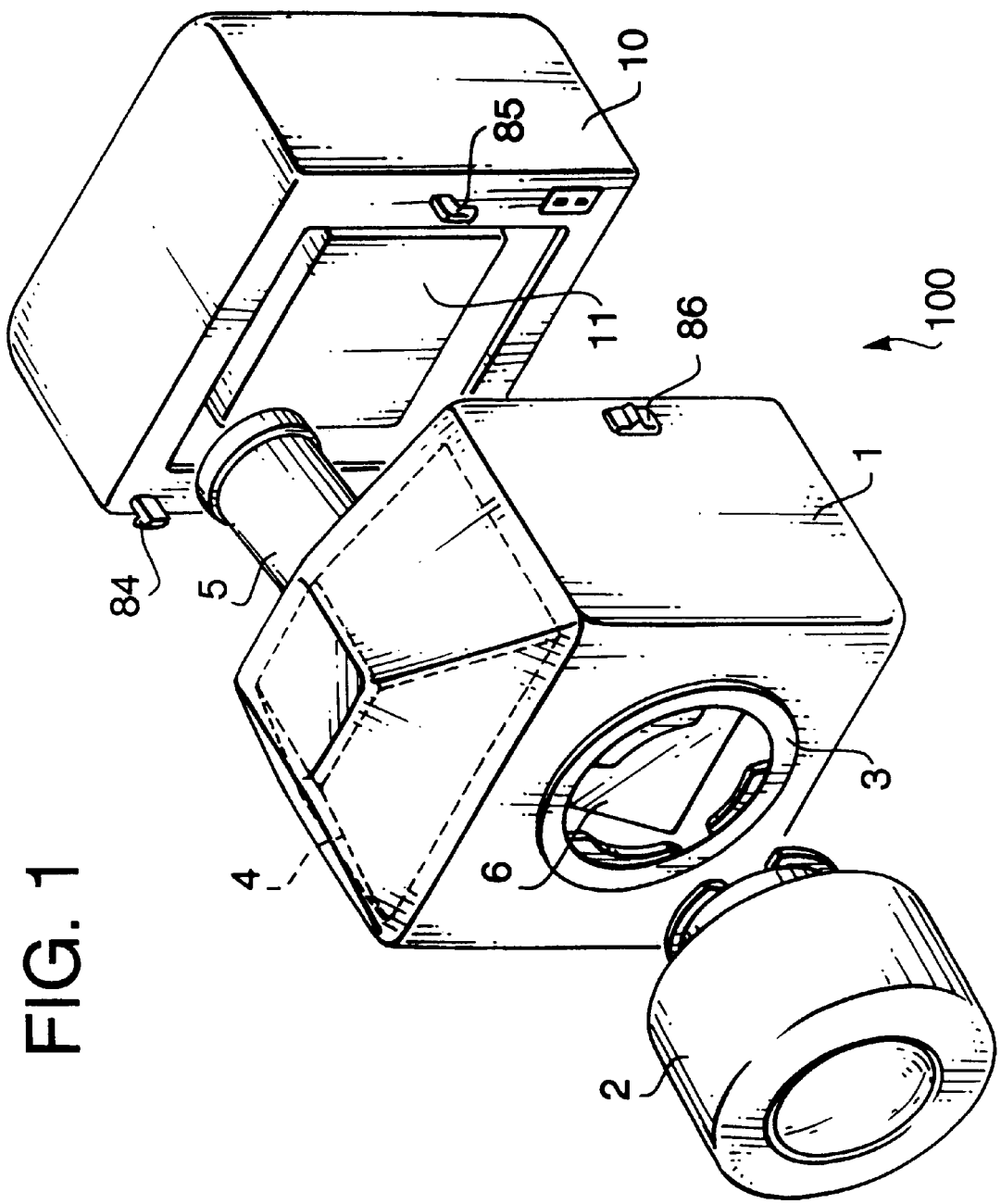
FIG. 1 is a perspective view of a single lens reflex camera according to a first embodiment of the present invention.
Figure 2:
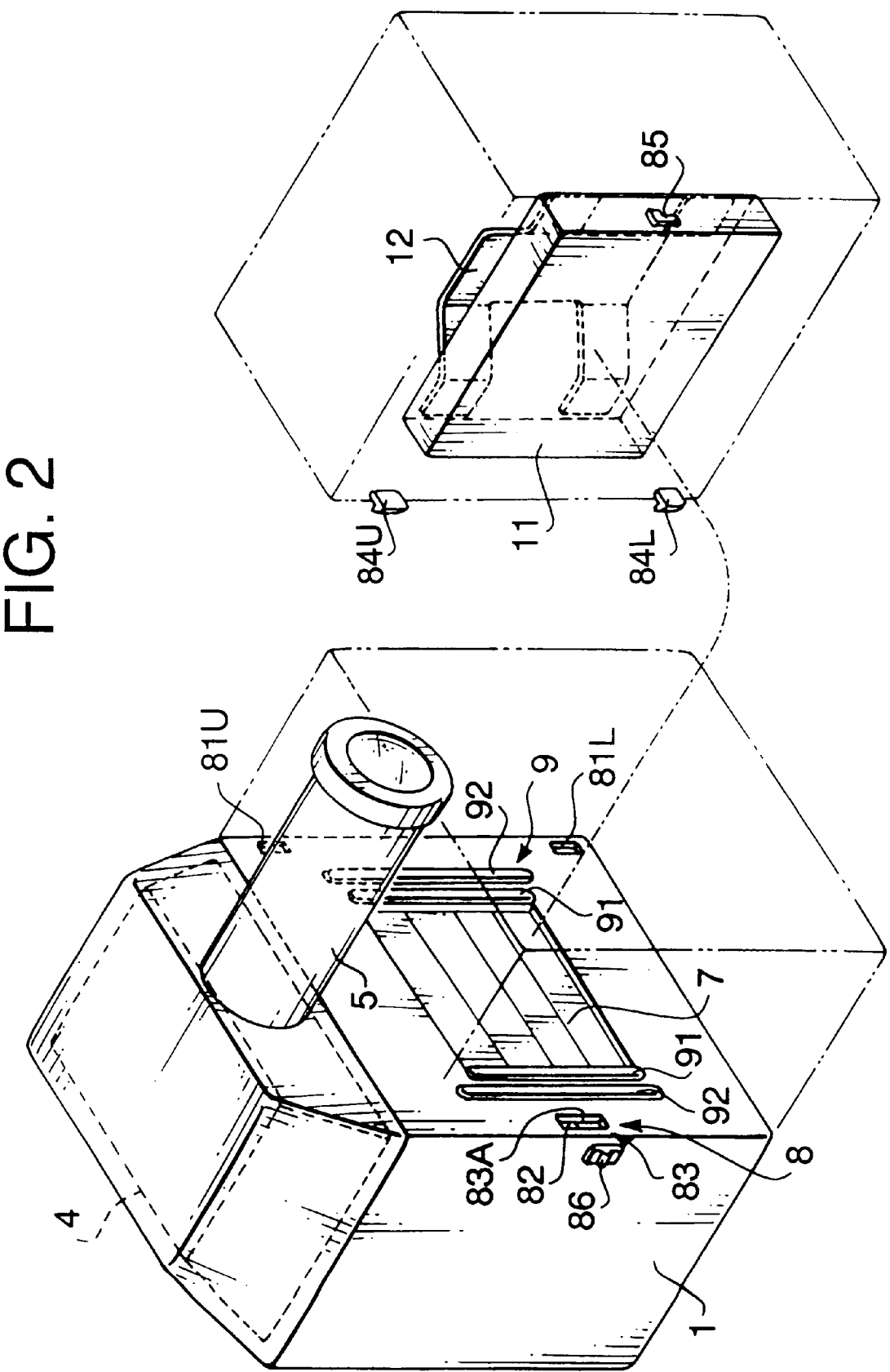
FIG. 2 is a schematic perspective view illustrating a detachable camera back of the camera of FIG. 1.

FIG. 1 is a perspective view of a single lens reflex camera 100 according to a first embodiment of the present invention and FIG. 2 is a schematic perspective view illustrating the camera 100 when a camera back (or a roll film holder) is detached. The camera 100 is a medium-size SLR camera using a 120 roll film, for example, a 6×6 cm film, a 6×7 cm film, or the like.

The camera 100 includes a camera body 1, an exchangeable lens 2, and an exchangeable camera back 10.

A lens mount 3 is provided on a front surface of the camera body 1. The lens 2 is detachably mounted to the lens mount 3. The camera body 1 accommodates a prism 4 and a finder system 5. Further, the camera body 1 is provided with a quick return mirror 6, and a driving mechanism therefor (not shown).

As shown in FIG. 2, a rear surface of the camera body 1 is provided with a photographing aperture 7 which defines a photographing frame. The camera body 1 is further provided with a focal-plane shutter for opening or closing the photographing aperture 7 (not shown).

The camera body 1 and the camera back 10 are provided with a coupling mechanism 8 by which the camera back 10 may be detachably coupled with the camera body 1. As shown in FIG. 2, the coupling mechanism 8 includes a pair of hinge coupling openings 81U and 81L at one side of the rear surface of the camera body 1, and a lock opening 82 at the other side portion of the rear surface of the camera body 1. The lock opening 82 includes a locking mechanism 83. A front surface of the camera back 10 includes a pair of hinge coupling protrusions 84U and 84L, and a hook member 85 corresponding to the openings 81U, 81L, and 82 of the camera body 1.

The camera back 10 is coupled to the camera body 1 by, first, inserting the pair of protrusions 84U and 84L in the openings 81U and 81L, respectively, and then inserting the hook member 85 in the opening 82. The locking mechanism 83 includes a spring biased bar 83A which engages with the inserted hook member 85 such that the camera back 10 is secured to the rear side of the camera body 1. secured to the rear side of the camera body 1. The camera back 10 is detached from the camera body 1 by member 85, and the camera back 10 is detached from the camera body 1 by reversing the steps above.

Figure 3A:
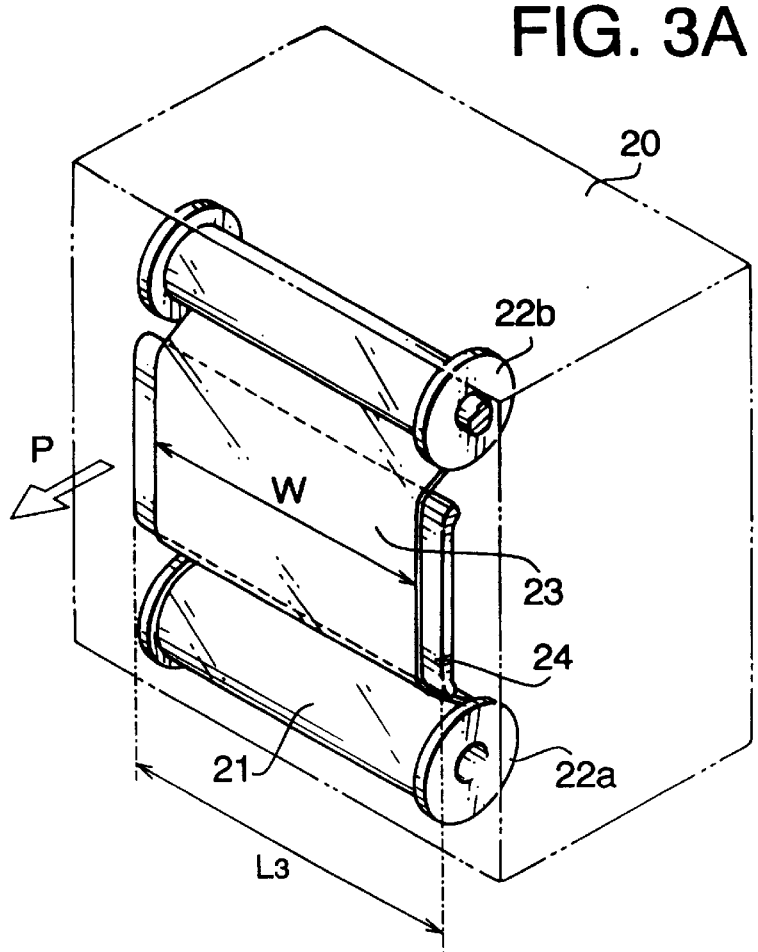
FIG. 3A shows a film camera back for the camera of FIG. 1.

The camera 100 may further include, as shown in FIG. 3A, a film camera back 20 for use with photographic film 21. The camera back 20 includes photographing film 21 and a pressure plate 24. The photographing film 21 is supported by a lower spool 22a and is taken up by an upper spool 22b. A portion 23 of the film 21 located in front of the pressure plate 24 represents a frame of film that is to be exposed to light by opening the focal-plane shutter of the camera body 1. The pressure plate 24 is spring-biased such that the pressure plate 24 is urged towards the camera body 1 as indicated by an arrow P.

In order to accommodate both the camera back 10 and the film camera back 20, as shown in FIG. 2, the camera body 1 is provided with, on the rear surface thereof, rail unit 9. The rail unit 9 includes a pair of inner rails 91 and 91 provided at either side of the photographing aperture 7 and a pair of outer rails 92 and 92 provided on the outer side of the inner rails 91 and 91, respectively. The inner and outer rails 91, 91, 92 and 92 are provided for guiding the film 21. In this embodiment, the inner and outer rails 91, 91, 92 and 92 are also used for positioning an imaging device when a camera back provided with the imaging device is attached.

Figure 3B:
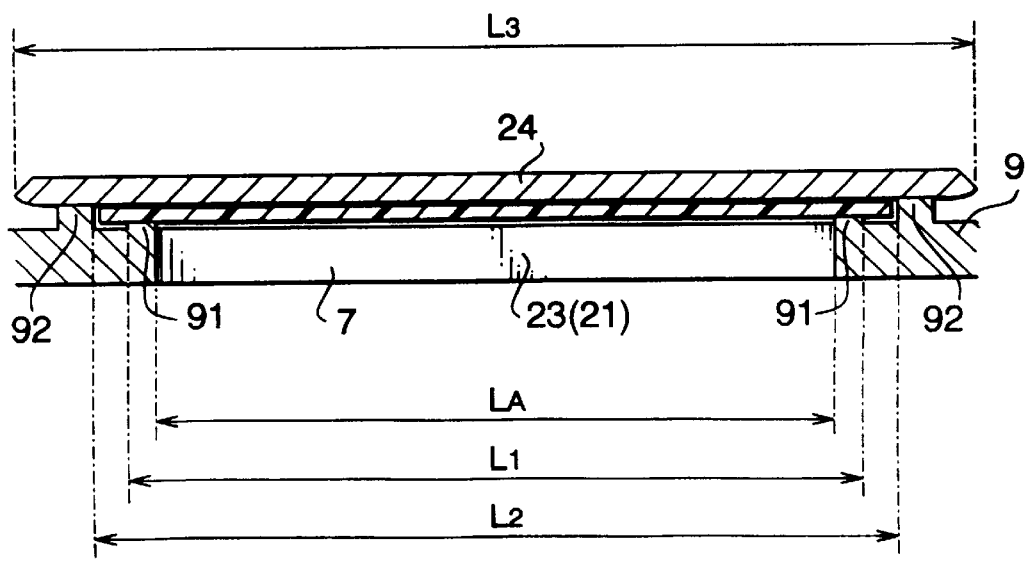
FIG. 3B is a sectional view of an area around a photographing aperture of the camera when the film camera back of FIG. 3A is attached.

When the film camera back 20 is used, the inner and outer rails 91, 91, 92 and 92 are used for guiding the film 21, as described with reference to FIG. 3B. FIG. 3B is a cross sectional view of an area around the photographing aperture 7 when the camera back 20 is coupled to the camera body 1.

As shown in FIG. 3B, the photographing aperture 7 has an aperture length LA, outer edges of the inner rails 91 and 91 are separated by a distance L1, inner edges of the outer rails 92 and 92 are separated by a distance L2, and the inner rails 91 and 91 protrude less with respect to the rear surface of the camera body 1 than the outer rails 92 and 92.

When the film camera back 20 is attached, because the length L3 of the pressure plate 24 in a longitudinal direction (i.e., in a direction parallel to a longer side of a photographing frame) is greater than a distance L2 between the pair of outer rails 92 and 92, the pressure plate 24 contacts the outer rails 92 and 92. Further, because a width W of the file.21 is smaller than the distance L2 but greater than the distance L1, the film 21 is supported by the pressure plate 24 and the inner rails 91 and 91, such that the film 21 (23) defines a flat image plane. Further, the film 21 (23) is prevented from skewing by the outer rails 92 and 92.

The rail unit 9 is also used with the camera back 10, as described below, however, first, a more detailed description of the camera back 10 is provided.

Figure 4:
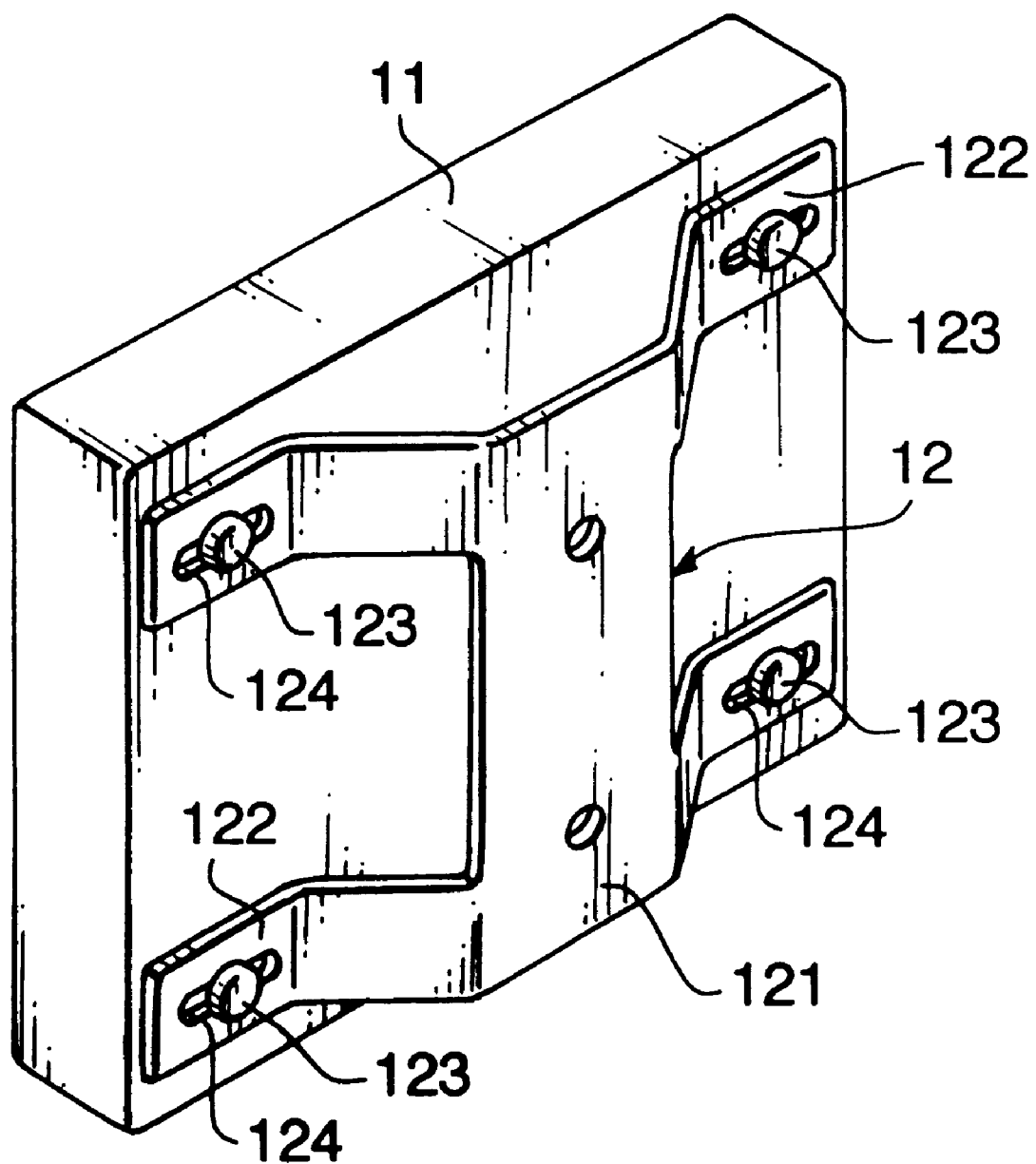
FIG. 4 is a perspective view of an imaging device and a plate spring attached to the imaging device.

As shown in FIG. 2, the camera back 10 is provided with an imaging device 11. FIG. 4 shows the rear side of the imaging device 11. A plate spring 12 is provided on the rear side of the imaging device 11 so that the imaging device 11 is biased towards the camera body 1.

As shown in FIG. 4, the plate spring 12 is substantially H-shaped, having a central portion 121, and four leg portions 122. The central portion 121 and the four leg portions 122 are on different planes so that a resilient force may be exerted therebetween.

The central portion 121 is secured to the camera back 10 with screws or the like. The leg portions 122 are each provided with a groove 124 and each leg portion 122 is secured to the rear surface of the imaging device 11 by inserting a screw 123 through the groove 124. The screws 123 are slidable in the grooves 124 so that the leg portions 121 are slidable with respect to the imaging device 11. It should be noted that a positional relationship between the imaging device 11 with respect to the inner and outer rails 91, 91, 92 and 92 should be taken into account when the plate screw 12 is secured to the camera back 10.

Figure 5:
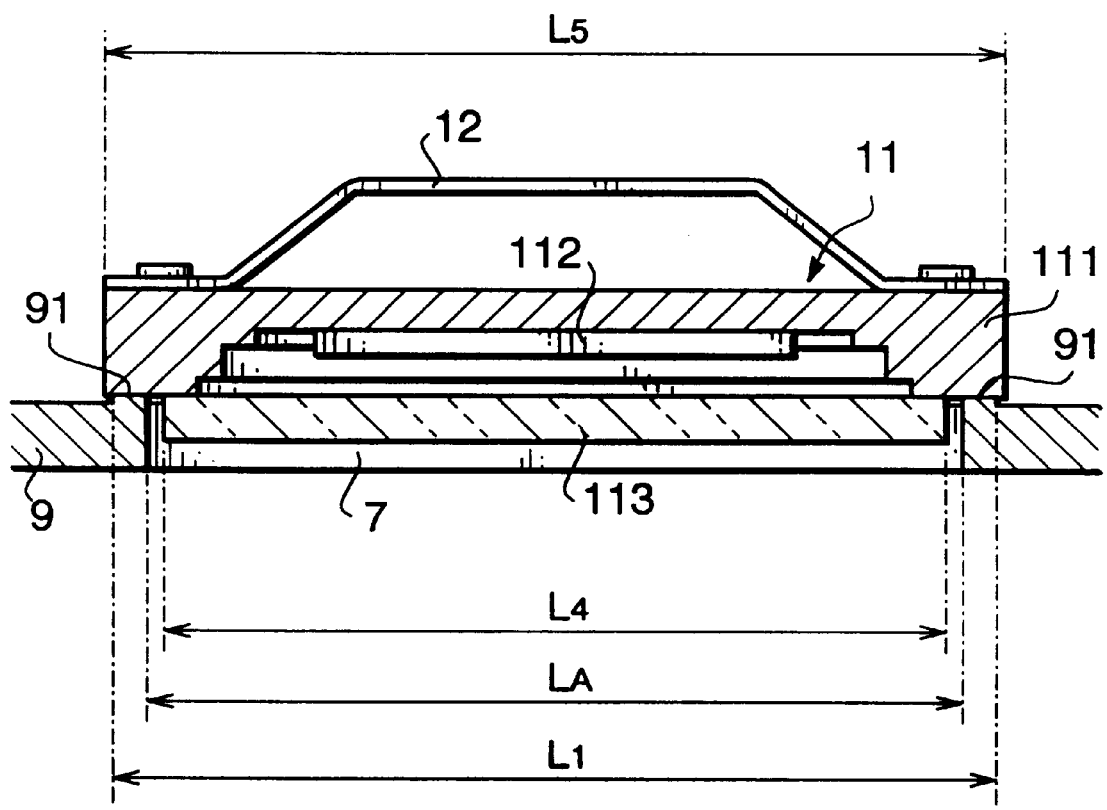
FIG. 5 is a sectional view of the area around the photographing aperture when a camera back according to a first embodiment is attached.

FIG. 5 shows the area around the photographing aperture 7 when the camera back 10 is attached to the camera body 1. As shown in FIG. 5, the imaging device 11 includes a package 111 that houses a CCD element 112 which is covered by a glass plate 113. The CCD element 112 is connected to an image signal processing circuit (not shown) which is also provided in the camera back 10.

Also as shown in FIG. 5, a longitudinal length L4 of the glass plate 113 is slightly shorter than the length LA of the photographing aperture 7. Further, a longitudinal length L5 of the package 111 is slightly longer than the distance L1, and slightly shorter than the distance L2 (the distance L2 is shown in FIG. 3B). Lengths of shorter sides of the glass plate 113, the package 11, and the CCD element 112 are determined appropriately.

Accordingly, when the camera back 10 is attached to the camera body 1, the glass plate 113 is inserted in the photographing aperture 7, while the front surface of the package 111 contacts the pair of inner rails 91 and 91.

By comparing FIGS. 3B and FIG. 5, it is apparent that an image forming plane, i.e., the plane at which an in-focus image is formed, will be different for the film camera back 20 and for the camera back 10. That is, for the film camera back 20, shown in, FIG. 3, the image forming plane is the surface of the film 23 (21), whereas, for the camera back 10, the image forming plane is the image receiving surface of the CCD element 112.

In this embodiment, a refractive index and a thickness of the glass plate 113 are appropriately determined so that the glass plate 113 optically shifts the image plane rearward to coincide with the image receiving plane of the CCD element 112.

When the camera back 10 is coupled to the camera body 1, as described above and shown in FIG. 5, the imaging device 11 is urged towards the camera body 1 by the force of the plate spring 12. Also front surface of the package 111 is press contacted with the inner rails 91 and 91, and the glass plate is inserted in the photographing aperture 7. Under this condition, a force is applied to the plate spring 12 in a direction such that a distance between a plane of the leg portions 122 and a plane of the central portion 121 becomes shorter. Further, as described above, each leg portion 122 includes the groove 124 which allows relative movement between the imaging device 11 and the plate spring 12, and accordingly allows for deformation of the plate spring 12. With this arrangement, the relative movement of the leg portions 122 and the imaging device 11 occurs substantially evenly. Thus an orientation of the image receiving surface of the CCD element 112 is maintained, i.e., the image receiving surface of the CCD element 112 stays perpendicular to the optical axis of the camera body 1.

Thus, even if a positional relationship between the camera body 1 and the camera back 10, and/or the positional relationship between the camera back 10 and the imaging device 11 are set roughly, the image receiving surface of the CCD element 112 can be accurately and easily positioned because the imaging device 11 is biased by the plate spring 12. Accordingly, without a complicated structure, an in-focus image is formed on the image receiving surface of the CCD element 112.

Figure 6A:
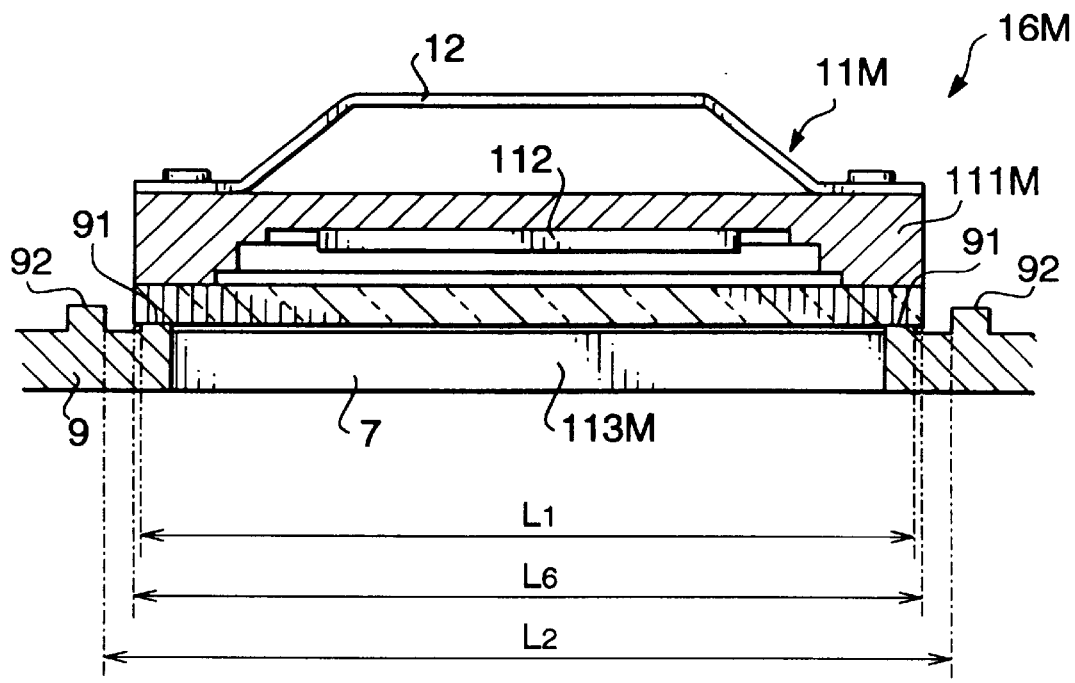
FIG. 6A is a sectional view of the area around the photographing aperture when a camera back according to a second embodiment is attached.

FIG. 6A shows a cross section of an area around the photographing aperture 7 and an imaging device 11M according to a second embodiment of the invention.

The imaging device 11M includes a package 111M which is similar to the package 111 described above except that is includes a glass plate 113M. The glass plate 113M is formed of a rod lens array and has a longitudinal length L6 that is greater than the distance L1 between the outer sides of the pair of inner rails 91 and 91, and less than the distance L2 between the inner sides of the pair of outer rails 92 and 92. Accordingly, the front surface of the glass plate 113M contacts the pair of inner rails 91 and 91 when the camera back 16M is coupled to the camera body 1.

Thus, in this embodiment, the front surface of the glass plate 113M coincides with the surface of the film 23 (21) (shown in FIG. 3) which represents the image forming plane defined by the camera body 1. In this case, an image formed on the surface of the glass plate 113M is shifted, by a rod lens array, to the image receiving surface of the CCD element 112, as described below.

Figure 6B:
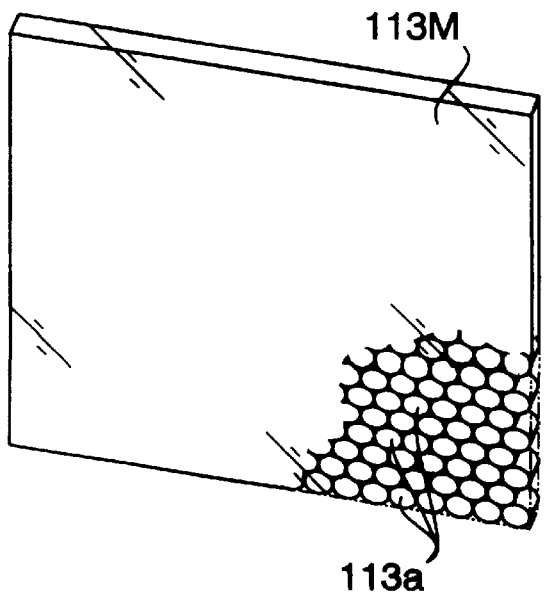
FIG. 6B shows a rod lens array provided to a front of the imaging device.

FIG. 6B schematically shows a structure of the glass plate 113M. The glass plate 113M includes a plurality of rod lens elements 113a, which are two-dimensionally arranged such that the optical axes thereof are perpendicular to the plane on which the rod lens elements 113a are arranged.

FIG. 7A shows a rod lens element 113a and FIG. 7B is a graph showing a refractive index distribution for the rod lens element 113a. As shown in FIG. 7B, the rod lens element 113a has a parabolic refractive index distribution with a maximum at the optical axis thereof. An example of such a rod lens element 113a is known as a "SELFOC lens" manufactured by Japan Plate Glass Kabushiki Kaisha.

A function of this type of gradient index rod lens 113a is illustrated in FIG. 7C. By using the rod lens 113a, a light beam incident on one side surface proceeds through the lens, and is emitted from the other side surface. Thus, by setting the length of the rod lens appropriately, an image IM1 formed on the front surface of the glass plate 113M can be shifted to a predetermined position on the rear side of the glass plate 113M as an erect image IM2. Thus, the image formed by the camera body 1 can be shifted to the image receiving surface of the CCD element 112. Accordingly an in-focus image can be photographed.

In the above described embodiments, the inner rails 91 and 91 are used for defining the position of the glass plate 113, 113M, However, other structures are possible, for example, the outer rails 92 and 92 or other members may be used to define the position of the imaging device 11. In such a case, the image forming plane may be adjusted accordingly as described above.

Further, in the embodiments, a plate spring is used for biasing the imaging device towards the camera body. It is also possible to use other resilient members such as coil springs, rubber members, or the like.

Still further, if the camera back or the camera body is provided with an LCD (Liquid Crystal Display) for displaying an image captured by the CCD, photographing can be performed while monitoring the image. Also, alternatively or optionally, it may be possible to provide an output terminal for outputting an image signal. In such a case, the image can be monitored by an external display device.

In the embodiments, a medium size camera using 6×6 cm film, or the like is described. It should be noted that the invention is applicable to any camera which can use a camera back provided with an imaging device. For example, the invention is applicable to a camera using 35 mm roll film.

The present disclosure relates to subject matter contained in Japanese Patent Application No. HEI 8-232809, filed on Sep. 3, 1996, which is expressly incorporated herein by reference in its entirety.

What is claimed is:

1. A camera comprising a camera body and a detachable camera back, said camera body comprising a film guide section arranged in a plane perpendicular to an optical axis defined by a lens attachable to said camera body, and said camera back comprising a digital imaging device and a biasing member which biases said digital imaging device such that, when said camera back is attached to said camera body, said digital imaging device is press contacted and biased against said film guide section, the biasing member comprising a spring member that applies a biasing force at least in a direction of the optical axis of said camera, the spring member comprising a plate spring including a plate portion fixed to the camera back and a plurality of resilient leg portions extending from the plate portion and slidably connected to a rear side of the digital imaging device such that the resilient leg portions are slidable in predetermined directions along the rear side of the digital imaging device.

2. The camera according to claim 1, said digital imaging device further comprising a glass plate provided at a front of an image receiving surface of said digital imaging device.

3. The camera according to claim 2, wherein, when said digital imaging device is press conacted to said guide section, said glass plate protrudes into a photographing aperture, said glass plate functioning to shift an image plane along the optical axis of the camera.

4. The camera according to claim 3, wherein said glass plate has a predetermined thickness and a predetermined index of refraction such that an in-focus image is formed on an image receiving surface of said digital imaging device.

5. The camera according to claim 2, wherein, when said digital imaging device is press contacted to said guide section so that a front surface of said glass plate coincides with the image plane, said glass plate functioning to shift the image plane along the optical axis of the camera.

6. The camera according to claim 5, wherein said glass plate is formed as a rod lens array.

7. The camera according to claim 1, said spring member applying a biasing force only in the direction of the optical axis.

8. The camera according to claim 1, said digital imaging device comprising a CCD element.

9. The camera according to claim 1, further comprising a plurality of screws slidably engaged with a groove formed in each of the resilient leg portions, the screws being attached to the rear side of the digital imaging device.

10. A camera back for use with a camera having a film guide section which defines an image plane of said camera, said camera back comprising:

a digital imaging device; and a biasing member that biases said digital imaging device to press contact said film guide section defined with respect to said image plane such that an image receiving surface of said digital imaging device is in a predetermined position at with respect to said image plane, the biasing member comprising a spring member that applies a biasing force at least in a direction of the optical axis of the camera, the spring member comprising a plate spring including a plate portion fixed to the camera back and a plurality of resilient leg portions extending from the plate portion and slidably connected to a rear side of the digital imaging device such that the resilient leg portions are slidable in predetermined directions along the rear side of the digital imaging device.

11. The camera back according to claim 10, said digital imaging device further comprising a glass plate provided at a front of said digital imaging device wherein, when said digital imaging device is press contacted to said guide section, said glass plate protrudes into a photographing aperture, and, wherein said glass plate has a predetermined thickness and a predetermined index of refraction such that an in-focus image is formed on an image receiving surface of said digital imaging device.

12. The camera back according to claim 10, said digital imaging device further comprising a glass plate provided at a front of said digital imaging device, wherein, when said digital imaging device is press contacted to said guide section, said glass plate press contacts said guide section, and, wherein said glass plate is formed as a rod lens array.

13. The camera back according to claim 10, said spring member applying a biasing force only in the direction of the optical axis.

14. The camera back according to claim 10, said digital imaging device comprising a CCD element.

15. The camera back according to claim 10, further comprising a plurality of screws slidably engaged with a groove formed in each of the resilient leg portions, the screws being attached to the rear side of the digital imaging device.

* * * * *

UNITED STATES PATENT AND TRADEMARK OFFICE
CERTIFICATE OF CORRECTION

PATENT NO.    : 6,035,147
DATED         : March 7, 2000
INVENTOR(S)   : Y. Kurosawa It is certified that error appears in the above-identified patent and that said Letters Patent is hereby corrected as shown below:

Column 6,
Line 64, the following claim was omitted and should be inserted:
--    The camera according to claim 1, said guide section comprising a pair of rails provided next to a photographing aperture of said camera body, said rails defining an image forming plane for said camera. --

Signed and Sealed this

Twelfth Day of November, 2002

*Attest:*

*Attesting Officer*

JAMES E. ROGAN
*Director of the United States Patent and Trademark Office*